US012638155B1

(12) United States Patent
Hou et al.

(10) Patent No.: US 12,638,155 B1
(45) Date of Patent: May 26, 2026

(54) CURVED LIGHT GUIDE FOR THIN STRUCTURE ILLUMINATION

(71) Applicant: Amazon Technologies, Inc., Seattle, WA (US)

(72) Inventors: Bin Hou, San Jose, CA (US); John Michael Cesaratto, Campbell, CA (US); Victoria Tan, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/609,756

(22) Filed: Mar. 19, 2024

(51) Int. Cl.
*F21V 14/06* (2006.01)
*F21K 9/232* (2016.01)
(Continued)

(52) U.S. Cl.
CPC .............. *F21V 14/06* (2013.01); *F21V 3/049* (2013.01); *F21K 9/232* (2016.08); *F21K 9/61* (2016.08); *F21K 9/66* (2016.08); *F21S 8/04* (2013.01); *F21V 3/00* (2013.01); *F21V 3/02* (2013.01); *F21V 3/04* (2013.01); *F21V 3/06* (2018.02); *F21V 3/061* (2018.02); *F21V 3/0615* (2018.02);
(Continued)

(58) Field of Classification Search
CPC .............. G02B 6/0095; F21Y 2103/33; F21Y 2105/18; G03B 21/142; G03B 21/145; G03B 21/20; G03B 21/2006; G03B 21/2013; G03B 21/2033; G03B 21/204; G03B 21/208; G03B 15/03; G03B 17/561; F21V 3/00; F21V 3/02; F21V 3/049; F21V 3/04; F21V 3/06; F21V 3/061; F21V 3/0615; F21V 3/062; F21V 3/0625; F21V 33/0052; F21V 33/0056; F21V 33/0076; F21V 21/34; F21V 21/35; F21V 21/30; F21K 9/232; F21K 9/61; F21K 9/66; G08B 13/19619; G08B 13/19632; F21S 8/04
See application file for complete search history.

(56) References Cited

U.S. PATENT DOCUMENTS 6,357,936 B1 * 3/2002 Elberbaum ........ G08B 13/1963
206/316.2
6,917,396 B2 * 7/2005 Hiraishi ............... G02B 5/0257
349/112
(Continued)

*Primary Examiner* — Colin J Cattanach
(74) *Attorney, Agent, or Firm* — K&L Gates LLP

(57) ABSTRACT

Systems are generally described that include a curved light guide for thin structure illumination. An example system includes a light sub-assembly comprising a curved light sub-assembly backing ring and a plurality of light-emitting diodes (LEDs), each LED of the plurality of LEDs being coupled to the curved light sub-assembly backing ring. The example system also includes a curved light guide having an edge coupled to the light sub-assembly, the curved light guide including a pattern of optical extraction features that distribute light and are positioned on the exterior surface of the curved light guide for uniformly distributing light from the plurality of LEDs. The example system also includes a curved reflector including an exterior surface coupled to an interior surface of the curved light guide, wherein the exterior surface is reflective, and a volumetric diffuser coupled to the exterior surface of the curved light guide.

18 Claims, 7 Drawing Sheets
(2 of 7 Drawing Sheet(s) Filed in Color)

(51) Int. Cl.

| | | |
|---|---|---|
| *F21K 9/61* | (2016.01) |
| *F21K 9/66* | (2016.01) |
| *F21S 8/04* | (2006.01) |
| *F21V 3/00* | (2015.01) |
| *F21V 3/04* | (2018.01) |
| *F21V 3/06* | (2018.01) |
| *F21V 8/00* | (2006.01) |
| *F21V 21/34* | (2006.01) |
| *F21V 21/35* | (2006.01) |
| *F21V 33/00* | (2006.01) |
| *F21Y 103/33* | (2016.01) |
| *F21Y 105/18* | (2016.01) |
| *F21Y 113/00* | (2016.01) |
| *F21Y 115/10* | (2016.01) |
| *G03B 15/03* | (2021.01) |
| *G03B 17/56* | (2021.01) |
| *G03B 21/14* | (2006.01) |
| *G03B 21/20* | (2006.01) |
| *F21V 3/02* | (2006.01) |
| *F21V 21/30* | (2006.01) |
| *G08B 13/196* | (2006.01) |

(52) U.S. Cl.

CPC ............. *F21V 3/062* (2018.02); *F21V 3/0625* (2018.02); *F21V 21/30* (2013.01); *F21V 21/34* (2013.01); *F21V 21/35* (2013.01); *F21V 33/0052* (2013.01); *F21V 33/0056* (2013.01); *F21V 33/0076* (2013.01); *F21Y 2103/33* (2016.08); *F21Y 2105/18* (2016.08); *F21Y 2113/00* (2013.01); *F21Y 2115/10* (2016.08); *G02B 6/0095* (2013.01); *G03B 15/03* (2013.01); *G03B 17/561* (2013.01); *G03B 21/142* (2013.01); *G03B 21/145* (2013.01); *G03B 21/20* (2013.01); *G03B 21/2006* (2013.01); *G03B 21/2013* (2013.01); *G03B 21/2033* (2013.01); *G03B 21/204* (2013.01); *G03B 21/208* (2013.01); *G08B 13/19619* (2013.01); *G08B 13/19632* (2013.01)

(56) References Cited

U.S. PATENT DOCUMENTS

| | | | | |
|---|---|---|---|---|
| 8,487,518 | B2 * | 7/2013 | Johnston | F21V 29/673 |
| | | | | 362/558 |
| 8,761,565 | B1 * | 6/2014 | Coleman | G02B 6/0045 |
| | | | | 362/628 |
| 9,213,178 | B1 * | 12/2015 | Giri | G02B 27/0172 |
| 9,880,346 | B2 * | 1/2018 | Tsai | G02B 6/0036 |
| 10,146,054 | B2 * | 12/2018 | Martinez | G02C 7/02 |
| 11,516,445 | B1 * | 11/2022 | Phillip | H04N 9/3141 |
| 2007/0126872 | A1 * | 6/2007 | Bolotine | H04N 7/181 |
| | | | | 348/E7.086 |
| 2015/0249777 | A1 * | 9/2015 | Chen | F21V 33/0052 |
| | | | | 348/151 |
| 2018/0274751 | A1 * | 9/2018 | Kennedy | G02B 6/0096 |
| 2020/0347999 | A1 * | 11/2020 | Li | H10H 20/813 |
| 2023/0023735 | A1 * | 1/2023 | Jones | G03B 15/03 |

* cited by examiner

200

Cable Spool Assembly 202

Yaw Motor 204

Motor Controller 206

Light Engine 214

Mirror Assembly 208

Motherboard 212

Powered USB Hub 210

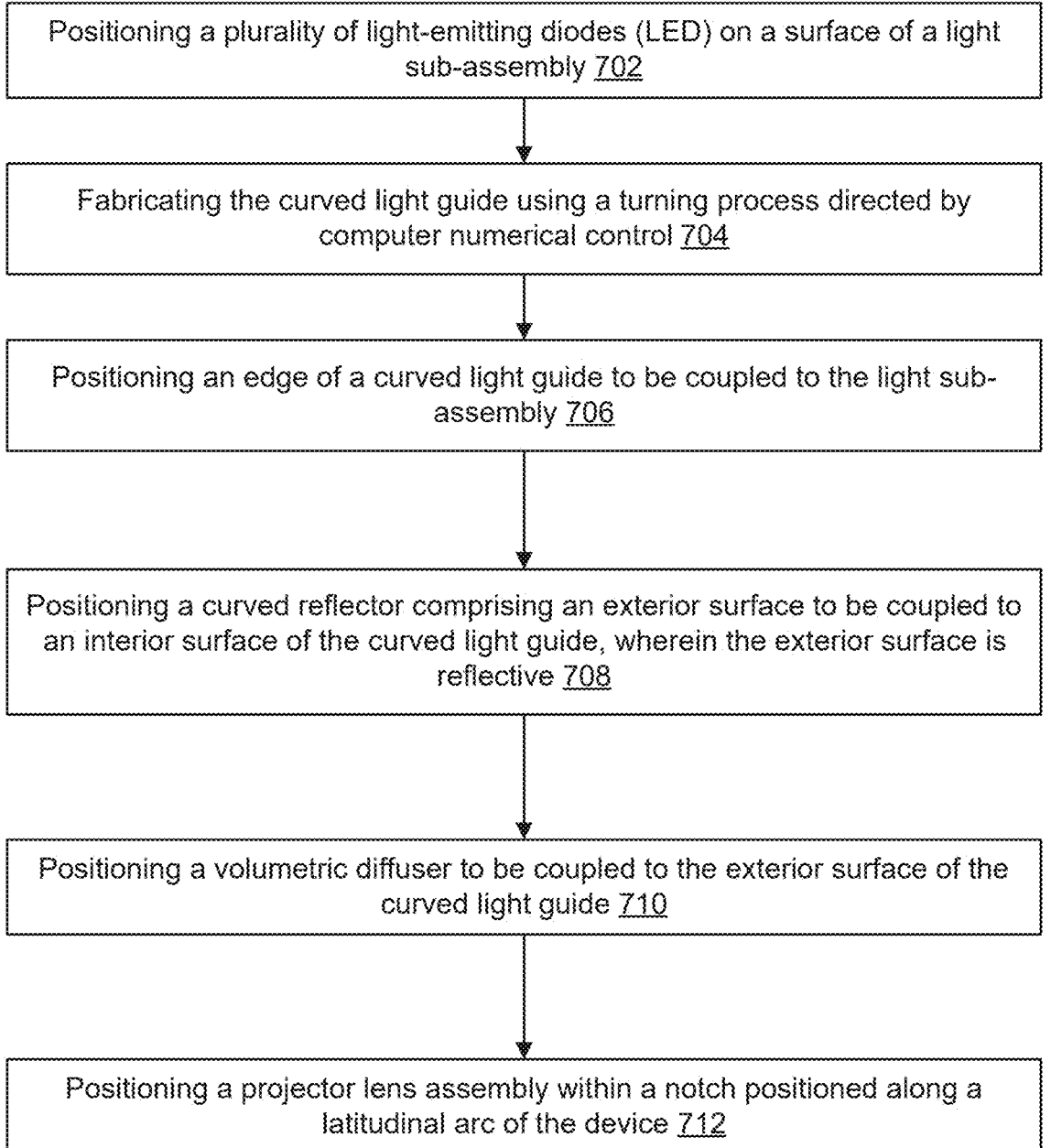

Positioning a plurality of light-emitting diodes (LED) on a surface of a light sub-assembly 702

Fabricating the curved light guide using a turning process directed by computer numerical control 704

Positioning an edge of a curved light guide to be coupled to the light sub-assembly 706

Positioning a curved reflector comprising an exterior surface to be coupled to an interior surface of the curved light guide, wherein the exterior surface is reflective 708

Positioning a volumetric diffuser to be coupled to the exterior surface of the curved light guide 710

Positioning a projector lens assembly within a notch positioned along a latitudinal arc of the device 712

FIG. 7

CURVED LIGHT GUIDE FOR THIN STRUCTURE ILLUMINATION

BACKGROUND

The increasingly common adoption of light emitting diodes (LEDs) for illumination has enabled more efficient and compact luminaires for a wide variety of applications. In certain applications, light guides may be necessary or beneficial to direct light from a source to a target volume. In traditional approaches, it may be difficult to evenly illuminate a large volume using LEDs and light guides under highly constrained space limitations.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 7 is a flowchart illustrating an example process for manufacturing a curved light guide for thin structure illumination, in accordance with various aspects of the present disclosure.

DETAILED DESCRIPTION

Figure 1:
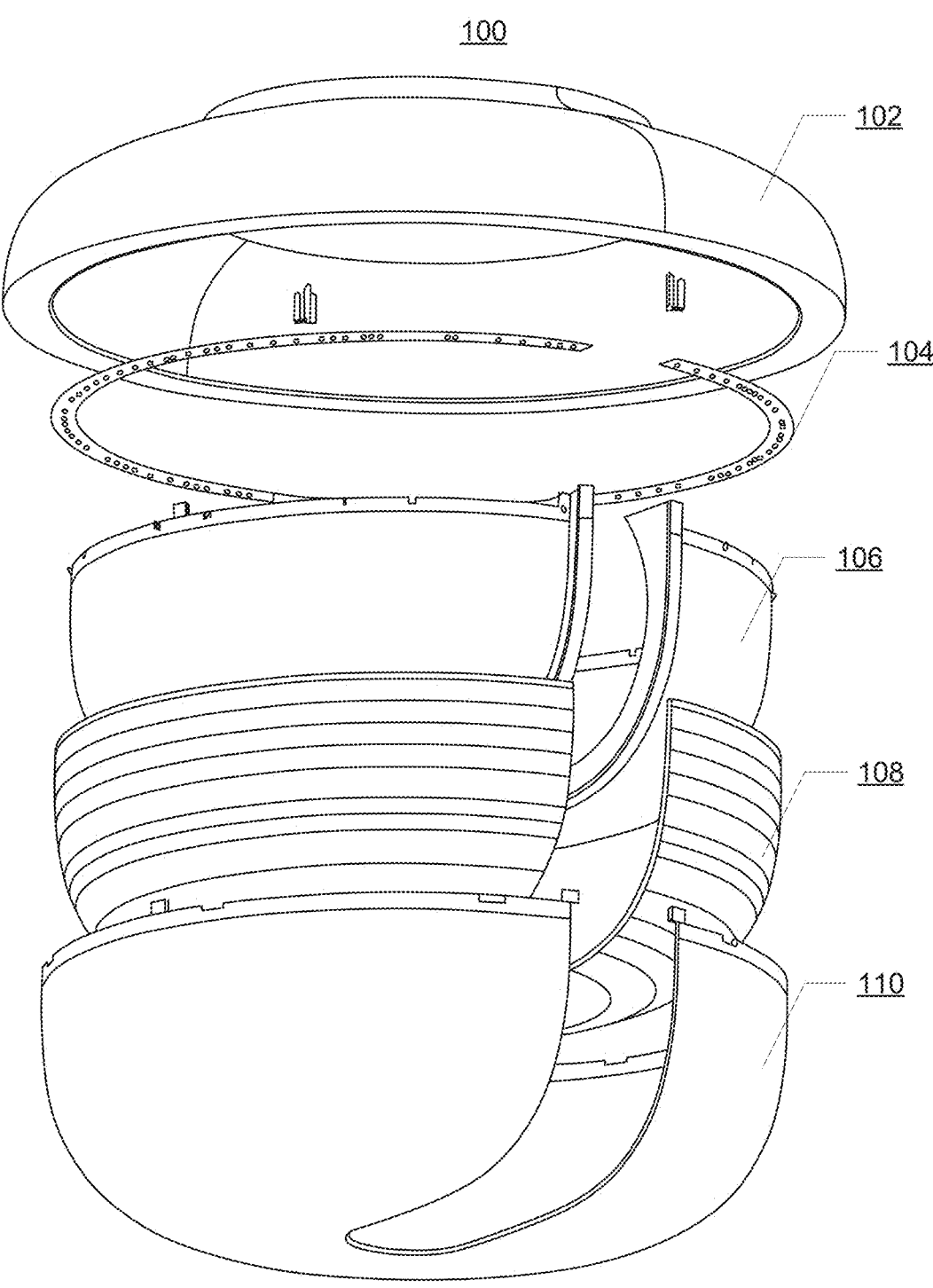
FIG. 1 is a design drawing illustrating an example system for curved light guide for thin structure illumination, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are systems, techniques, and interfaces that may be used for curved light guides for thin structure illumination. In various examples, a curved light guide couples to a light source at the top of a device and distributes light from the light source uniformly along the surface of the light guide to achieve uniform illumination on a large surface. The light guide and connected structures may be overall thin when compared with a traditional illumination system.

In various examples, the curved light guide system described herein may be constructed and configured to operate in conjunction with a steerable projector system. The steerable projector, motors, power supply, circuitry, and other associated components may be positioned so that the steerable projector system is contained within an internal volume of the curved light guide system. In various examples, the curved light guide system may comprise a notch for a movable projector lens to be repositioned about an axis parallel to the base of the device (or parallel to the ceiling, if the device is mounted on a ceiling). The curved light guide system and movable projector system may also be mounted on a movable base that allows the entire assembly to rotate about a vertical axis perpendicular to the base of the device (or ceiling) to reposition the movable projector lens.

While various examples are described in the context of a thin structure encasing a movable projector system, it will be understood that the curved light guide for thin structure illumination described in connection with various examples disclosed herein may operate without a movable projector system, with other electronic systems contained within the light guide system, or in other contexts.

While various examples are described herein as comprising a curved light guide, the shape of the light guide in various examples may be any of a variety of shapes, including flat (e.g., planar), spherical or hemispherical, or any arbitrary curved shape, having concave and/or convex surfaces. The light guide may also be shaped with defined edges, for example, a cube or dodecahedron shape. Near the edges of a shape with defined edges, the light guide will be understood to include a region with large curvature near the edge surrounded by a locally flat region. For example, a ninety-degree angle at the edge of a cube may be constructed as a small region having a relatively small radius of curvature near the ninety-degree angle to approximate a sharp corner in the shape of the light guide.

Various examples disclosed herein provide advantages over light guides known in the art by uniformly distributing light across uneven or curved surfaces while being constructed with thin structures (e.g., a structure capable of containing various electronic components in the interior of the structure). Various examples disclosed herein allow wall or ceiling-mounted electronic devices to add capabilities to function as luminaires without significantly increasing the size and/or footprint of the overall device. For example, a device with internal electronics may provide equivalent illumination functionality to a traditional ceiling-mounted luminaire while also providing the capabilities of the internal electronic device such as projection, voice recognition, speakers, wireless communication, and/or the like. Example electronic devices that include a light guide such as the various examples disclosed herein may seamlessly replace a traditional ceiling-mounted or other luminaire.

In contrast with examples in the prior art, various examples disclosed herein utilize a pattern of extraction features on the surface of the curved light guide with properties that vary based on the local curvature of the curved light guide to evenly distribute light. For example, the density, size, and height of the extraction features may increase or decrease to compensate for changes in the local curvature of the surface of the light guide. The extraction features may provide good uniformity of extracted light across the surface of the light guide, and a diffuser layer positioned outside of the curved light guide may diffuse the light from the extraction features of the curved light guide to improve the illumination quality for users.

FIG. 1 is a design drawing illustrating an example system 100 for curved light guide for thin structure illumination. The example system 100 comprises a stack of subsystems providing structural support and illumination functions. In various examples, an example system 100 may comprise a top housing 102. The top housing 102 may provide structural support and may couple to other components of the example system 100 (e.g., light sub-assembly 104, reflector 106, curved light guide 108, volumetric diffuser 110). In examples that may mount to a wall or ceiling, the top housing 102 may provide holes, hooks, latches, or other structures for mounting the top housing to a wall or ceiling.

In various examples, the top housing 102 may further provide housing or locations to seat various electronics or other mechanical devices, such as components of a movable projector system, or any other electronic devices that may be housed within the example system 100. The top housing 102 may, additionally or alternatively, provide mounting surfaces for light sub-assembly 104, reflector 106, curved light guide 108, and/or volumetric diffuser 110. The top housing 102 may further provide mounting surfaces and/or housing for various power supplies, sensors, or other componentry associated with the light sub-assembly 104. The top housing 102 may be fabricated or otherwise configured to have a shape that accommodates mounting or otherwise containing various electronics or other components that are positioned within the interior of the example system 100. The top housing 102 may be sized and/or shaped according to the spatial and structural requirements for containing an electronic device, such as a movable projector system or other device.

The example system 100 may further comprise a light sub-assembly 104 that provides backing and support for LEDs which emit light to be distributed by the light guide and diffuser systems. The light sub-assembly 104 depicted in FIG. 1 is a ring shape, though other shapes having curves and/or edges are possible. In one illustrative example shown by example system 100, the curved light sub-assembly backing is an aluminum core with white masking. The curved light sub-assembly backing provides structural support and a surface to which the LEDs are affixed. The curved light sub-assembly further may be coupled to sensors, power supplies, and other supporting components of the light sub-assembly 104.

The light sub-assembly 104 comprises a plurality of LEDs, which may be printed circuit board (PCB) LEDs. In one illustrative example shown by example system 100, 84 white LEDs may be included. In the example system 100, the LEDs may use a 2835 surface mound device (SMD) package with 3 LEDs per string. The LED 2835 SMD package may refer to an LED chip with 2.8 mm by 3.5 mm dimensions. The example system 100 may use LEDs with correlated color temperature (CCT) of 3000K and color rendering index of 80.

The light sub-assembly 104 may include a break in the continuous line of LEDs, as seen in FIG. 1. The break or gap in the curved light sub-assembly backing ring may align with a notch shown in other components of the example system 100 (reflector 106, curved light guide 108, volumetric diffuser 110). The break may allow for a lens of a movable projector to be positioned along the same latitudinal line as the break in the curved light sub-assembly backing ring. The light sub-assembly 104 may be shaped and positioned to follow a contour of an edge of the curved light guide 108, so that light from the light sub-assembly 104 may be transmitted directly to the curved light guide 108.

While example system 100 is described and depicted using white LEDs, it will be understood that any color of LED light may be used in conjunction with the light guides and illumination systems described herein. For example, color LEDs may be used with electronic controls enabling changing colors according to various preset color patterns. In another example, white LED light of varying CCT, brightness, and other properties may be used with a preset system to vary between a "daytime mode" with brighter light and an "evening mode" with dimmer light with temperature and color adjusted for improved comfort and relaxation. Electronic controllers may smoothly transition between different color lighting modes. In various examples, the LED controllers may be controlled by processors and other circuitry of an internal movable projector system (described below in connection with FIG. 2).

The example system 100 may further comprise a reflector 106 that reflects leaked light from other components away from the interior of the example system 100 and towards the illuminated exterior region. The reflector 106 may comprise materials on an exterior surface such that the exterior surface is reflective. The exterior surface may be coupled to an interior surface of the curved light guide and/or other components of the example system 100. An interior surface of the reflector 106 may surrounds and protect various components of another device, such as the movable projector system described previously.

The reflector 106 may comprise plastic material and the exterior surface may be painted white with satin white paint for reflectivity. In various examples, the reflectivity of the reflector 106 may be at least 85%.

The reflector 106 may include various hooks, latches, or other structures for securing the reflector 106 to top housing 102 or other components of the example system 100. In various examples, the reflector 106 may be removable and allow access to the interior of example system 100, for example, to access components of an internal electronic device such as a movable projector system.

The reflector 106 and other components of example system 100 may include a gap or notch which allows a movable projector lens or other components of an electronic device housed in the interior of example system 100 to interact with or otherwise operate using the volume exterior to example system 100. Although the reflector 106 and other components of example system 100 may be constructed in any arbitrary shape with curves and/or edges, the hemispherical shape depicted in FIG. 1 may include a notch along a longitudinal line of the hemispherical shape, which enables a movable projector lens to rotate about an axis parallel to the ceiling or top housing 102 base, and perpendicular to the longitudinal line of the notch or gap.

The notch or gap in the surface of reflector 106 may further include a raised structure to improve reflectivity around the notch and prevent light leakage. The surface of the raised lip or raised structure around the notch may also be painted white with satin white paint or otherwise configured to be a reflective surface so that light is reflected away from the notch. The lip or raised structure around the notch may be sized so that exterior components (e.g., curved light guide 108, volumetric diffuser 110) fit securely against the lip, with the notch of the exterior component surrounding the lip of the reflector 106 to limit light leakage from curved light guide 108 and/or volumetric diffuser 110.

The example system 100 may further comprise a curved light guide 108 with an edge coupled to light sub-assembly 104. The curved light guide 108 may include a pattern of optical extraction features that distribute light from the plurality of LEDs of light sub-assembly 104 to an exterior surface of curved light guide 108. The pattern of optical extraction features may be positioned on the exterior surface of curved light guide 108 with areal density based on a local curvature of the curved light guide for uniformly distributing light from the plurality of LEDs.

The curved light guide 108 may be constructed from clear polymethyl methacrylate (PMMC) and/or polycarbonate (PC) plastic material. The curved light guide 108 may be constructed using materials and/or structure such that the light transmission is at least 90% across 3 mm. In various examples, the curved light guide 108 may have a surface finish to create a uniform texture across the surface of the curved light guide 108. In various examples, a surface finish SPI-A2.

As mentioned previously, the curved light guide 108 may be formed in any arbitrary shape, which may include flat surfaces, curved surfaces, and/or edges. In various examples, edges in the curved light guide 108 may be constructed as a region of locally large curvature (e.g., a small radius of curvature) to approximate a sharp edge in the surface.

The curved light guide 108 may include one or more optical extraction features (or extraction features). The optical extraction features may be structures on the surface of the curved light guide 108 that allow light reflecting internally in the light guide to escape through the optical extraction feature. In various examples, the optical extraction feature may be a raised or indented surface.

The optical extraction features of the curved light guide 108 may be positioned with a regular areal density (or optical extraction feature spacing). The term areal density, as used here, refers to the number of optical extraction features within a unit of area (e.g., expressed in units of inverse meters squared). The areal density of the optical extraction features may determine various optical properties of the curved light guide 108, including the amount of light emitted across a given area. In order to achieve a more uniform luminance across the surface of the curved light guide 108, the areal density of optical extraction features may be based on a local curvature of the curved light guide. For example, the areal density of the optical extraction features may increase or decrease to compensate for decreased or increased luminance from geometric effects caused by local curvature of the curved light guide 108.

The optical extraction features of the curved light guide 108 may be shaped as hemispherical protrusions on the surface of the curved light guide 108. The hemispherical protrusion shape may provide a shape for the curved light guide 108 that is relatively easy to manufacture compared to a more complex shape. The hemispherical protrusion shape may further offer useful parameters to control, which allow the optical properties of the optical extraction features to be altered and studied in a controlled manner. For a hemisphere-shaped optical extraction feature, the radius of the hemisphere and the height of the hemisphere may be change independently, providing two parameters to tune in the design of the curved light guide 108. By modifying the height and radius of the hemisphere shape, different amounts of light may be tuned to be emitted out of the light guide to achieve uniform luminance across the surface of the curved light guide 108.

To ensure even luminance throughout the surface of the curved light guide 108, various properties of the optical extraction features may be varied based on local geometric properties of the curved light guide 108. For example, as discussed previously, the areal density of optical extraction features may vary based on the local curvature. Additionally or alternatively, optical extraction features of the curved light guide 108 may be shaped so that the radius and the height are based on the local curvature of the curved light guide. Other properties of the optical extraction features such as the distribution, density, shape, and/or the like may be varied across the surface of the curved light guide 108. The properties discussed here (areal density, radius, height, and the like) may vary based on geometric features of the curved light guide 108, such as local curvature. For example, relatively flat surfaces, or a surface that is curved only in one dimension may use a greater density of smaller (e.g., smaller radius) optical extraction features, while areas of greater curvature, including curvature in multiple dimensions, may use a reduced density of larger (e.g., greater radius) optical extraction features.

For improved manufacturing and/or testing, regions of the surface of curved light guide 108 may be split into distinct regions, with each region having a distinct set of properties (e.g., areal density, radius, height, and the like) for the optical extraction feature pattern. In other examples, properties of the optical extraction feature pattern may vary continuously or approximately continuously across the surface of curved light guide 108.

The example system 100 may further comprise a volumetric diffuser 110 for providing visual comfort to the lighting system and spreading light across a space for uniform illumination. The volumetric diffuser 110 may be a plastic component that spreads light about evenly to avoid bright spots, for example from light escaping the optical extraction features of the curved light guide 108. The volumetric diffuser 110 may additionally encase the other components of the example system 100 by affixing to the top housing 102, protecting other components such as the light sub-assembly 104 reflector 106, curved light guide 108, and/or electronic systems enclosed in a hollow volume inside of example system 100 (e.g., movable projector system).

In various examples, the volumetric diffuser 110 may include plastic material. In various examples, the plastic material may include 8% polyurethane material. The volumetric diffuser 110 may further have at least 43% light transmission through 3 mm of material. Additionally or alternatively, the volumetric diffuser 110 may have at least 20% light transmission through the full diffuser thickness (e.g., for light incident on the interior or exterior surface of the volumetric diffuser 110). Additionally or alternatively, the volumetric diffuser 110 may include a surface finish VDI-24 to provide uniformity and an appealing visual appearance across the exterior surface. Regardless of the materials used, the materials and construction of the volumetric diffuser 110 may be chosen to balance the competing demands of improving overall light transmission versus improving the uniformity of the diffuse light leaving the volumetric diffuser 110.

The volumetric diffuser 110 and other components of example system 100 may include a gap or notch which allows a movable projector lens or other components of an electronic device housed in the interior of example system 100 to interact with or otherwise operate using the volume exterior to example system 100. Although the volumetric diffuser 110 and other components of example system 100 may be constructed in any arbitrary shape with curves and/or edges, the hemispherical shape depicted in FIG. 1 may include a notch along a longitudinal line of the hemispherical shape, which enables a movable projector lens to rotate about an axis parallel to the ceiling or top housing 102 base, and perpendicular to the longitudinal line of the notch or gap.

In various examples, the volumetric diffuser 110 may include an air gap between the interior surface of the volumetric diffuser 110 and the exterior surface of the curved light guide 108. The air gap may optionally allow light to travel from the optical extraction features of the curved light guide 108 and propagate outward to spread before arriving at the interior surface of the volumetric diffuser 110. The air gap may allow some spread of the light from the curved light guide 108 without a significant reduction in the transmission of light from the curved light guide 108 to the volumetric diffuser 110.

Figure 2:
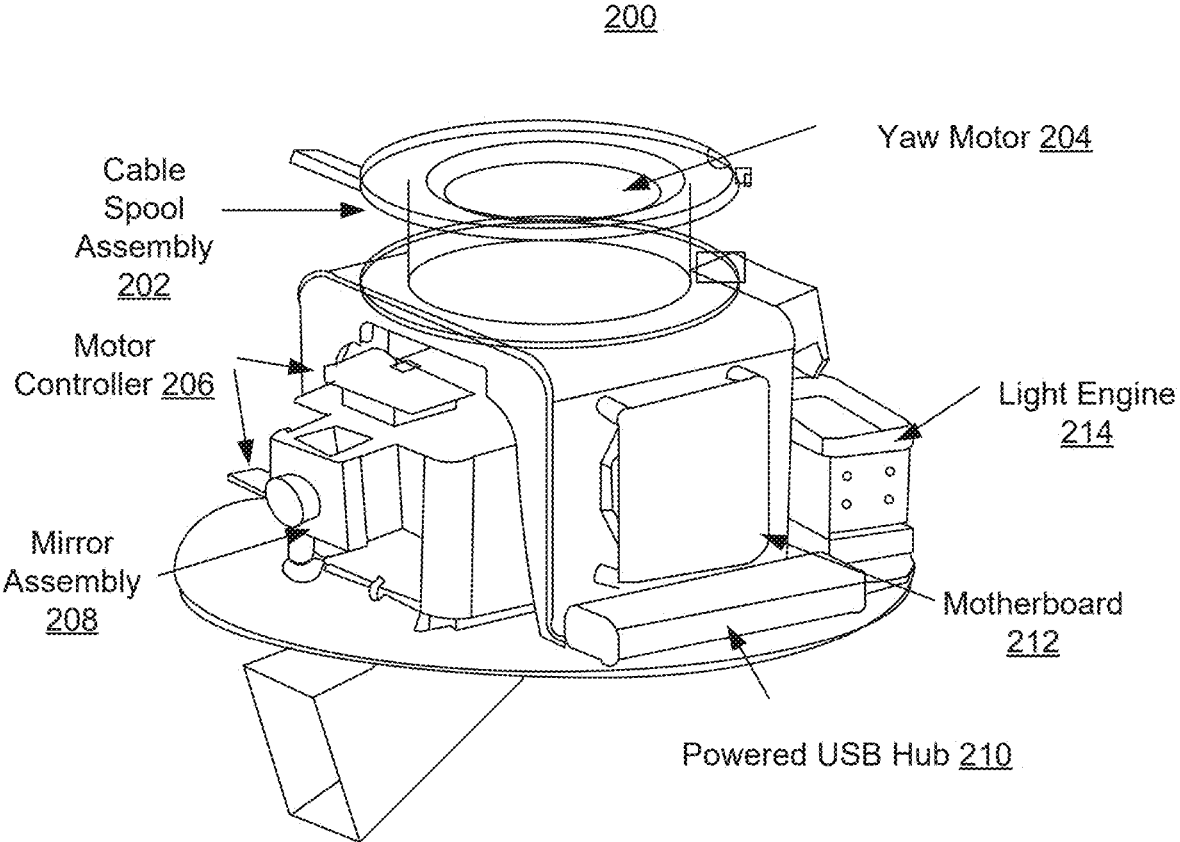
FIG. 2 is a design drawing illustrating an example apparatus for providing steering projection that may be used in accordance with various aspects of the present disclosure.

FIG. 2 is a design drawing illustrating an example movable projector system 200 for providing steering projection. The movable projector system 200 may include one or more processors, memory, and a wireless communication interface. FIG. 2 depicts the example apparatus from an inclined angle, showing various components of the rotating assembly. The cable spool assembly 202 is shown at the top of the figure, housing cables connecting to the ceiling mounting bracket (e.g., top housing 102, not pictured). The rotating assembly includes the yaw motor 204, motor controller 206, and mirror assembly 208, enabling steering of the steerable projector. The rotating assembly further includes a power universal serial bus (USB) hub 210, motherboard 212, and light engine 214. The movable projector system 200 is one example of a system which may be housed in the hollow interior of example system 100, which may be enhanced by providing an illumination system to the functionality of the movable projector system 200.

As mentioned previously, various devices, including electronics and other components, may be positioned in the hollow interior of an example system 100 to add luminaire capabilities to an existing device. Devices may include the movable projector system 200, which may include processor, memory, network and/or other communications capabilities, microphones, front-end audio processing, natural language processing, video card and image rendering capabilities, cameras, and/or any other components of computing devices known in the art. The LEDs of example system 100, included in the light sub-assembly 104, may be communicatively coupled to the processor of a movable projector system 200 or other internal electronic devices so that the processors may control the LEDs as well as communicate with any sensors or other electronic devices in the light sub-assembly 104.

Figure 3:
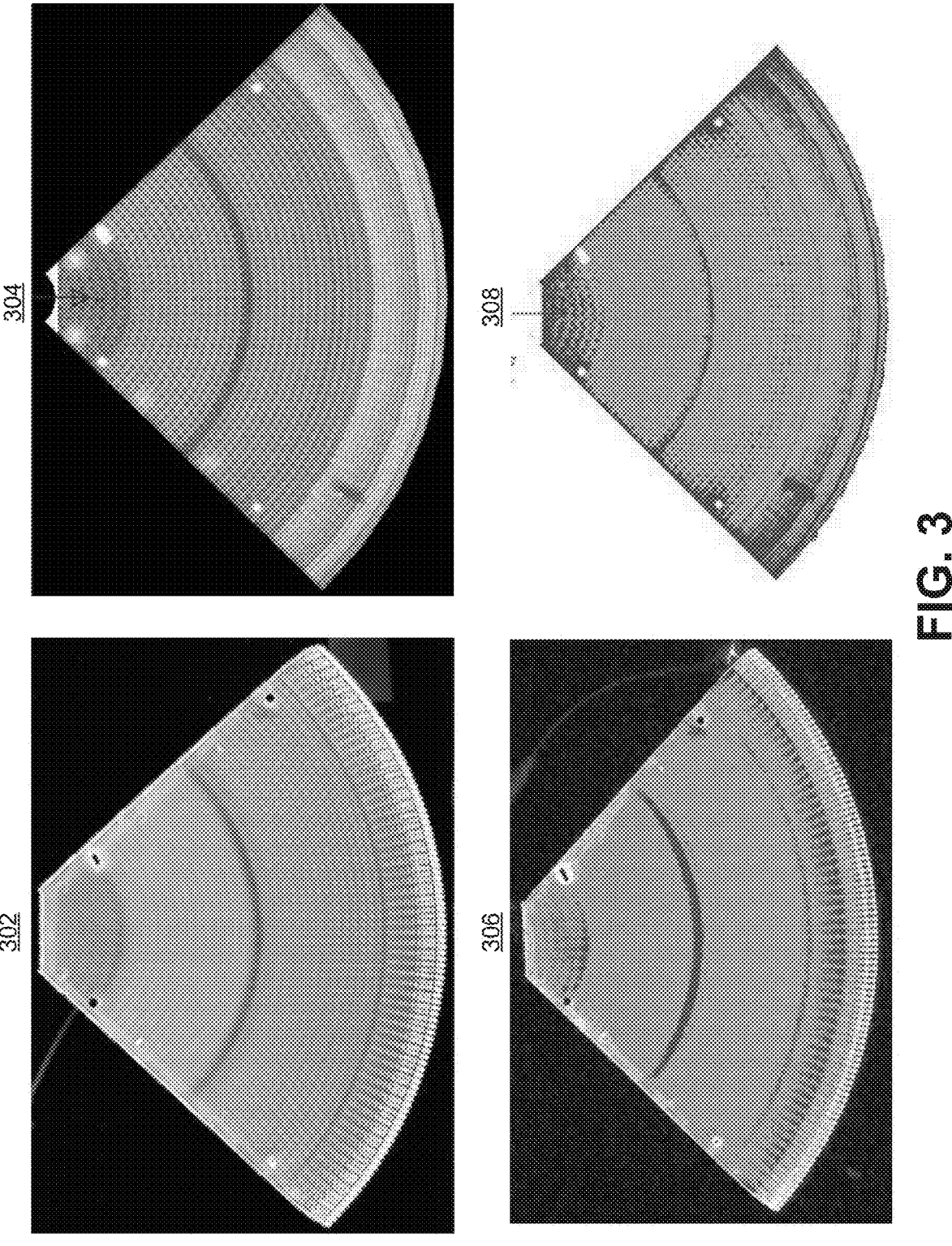
FIG. 3 illustrates a bottom surface view of a prototype and simulation of an example apparatus that may be used in accordance with various aspects of the present disclosure.

FIG. 3 illustrates a bottom surface view of a prototype and simulation of an example apparatus that may be used in accordance with various aspects of the present disclosure. FIG. 3 depicts optical design of an example system that may embody systems, techniques, and interfaces disclosed herein. The design depicted in FIG. 3 may be embodied, for example, by example system 100 depicted in FIG. 1. The design depicted in FIG. 3 includes a light guide, such as the curved light guide 108 described previously in connection with FIG. 1. The example light guide system depicted here uses 18 LEDs with 3.5 lm per LED.

View 302 and view 306 are photographs of a prototype light guide system constructed in accordance with some previous descriptions of example system 100. View 304 and view 306 are images of a simulated light guide system developed in accordance with some previous descriptions of example system 100. View 302 and view 304 illustrate the prototype and simulation in true color, while view 306 and view 308 are color-coded to depict the luminance at each point on the surface of the light guide system. Colors closer to red on the color spectrum indicate greater luminance, and colors closer to violet on the color spectrum indicate lower luminance.

As shown in FIG. 3, both the prototype light guide system and the simulated light guide system show good uniformity of luminance across the bottom surface. Points of light coming from optical extraction features are visible, due to the lack of a volumetric diffuser layer. The prototype light guide achieves an average luminance of 320 nit in the prototype model and 130 nit in the simulation.

Figure 4:
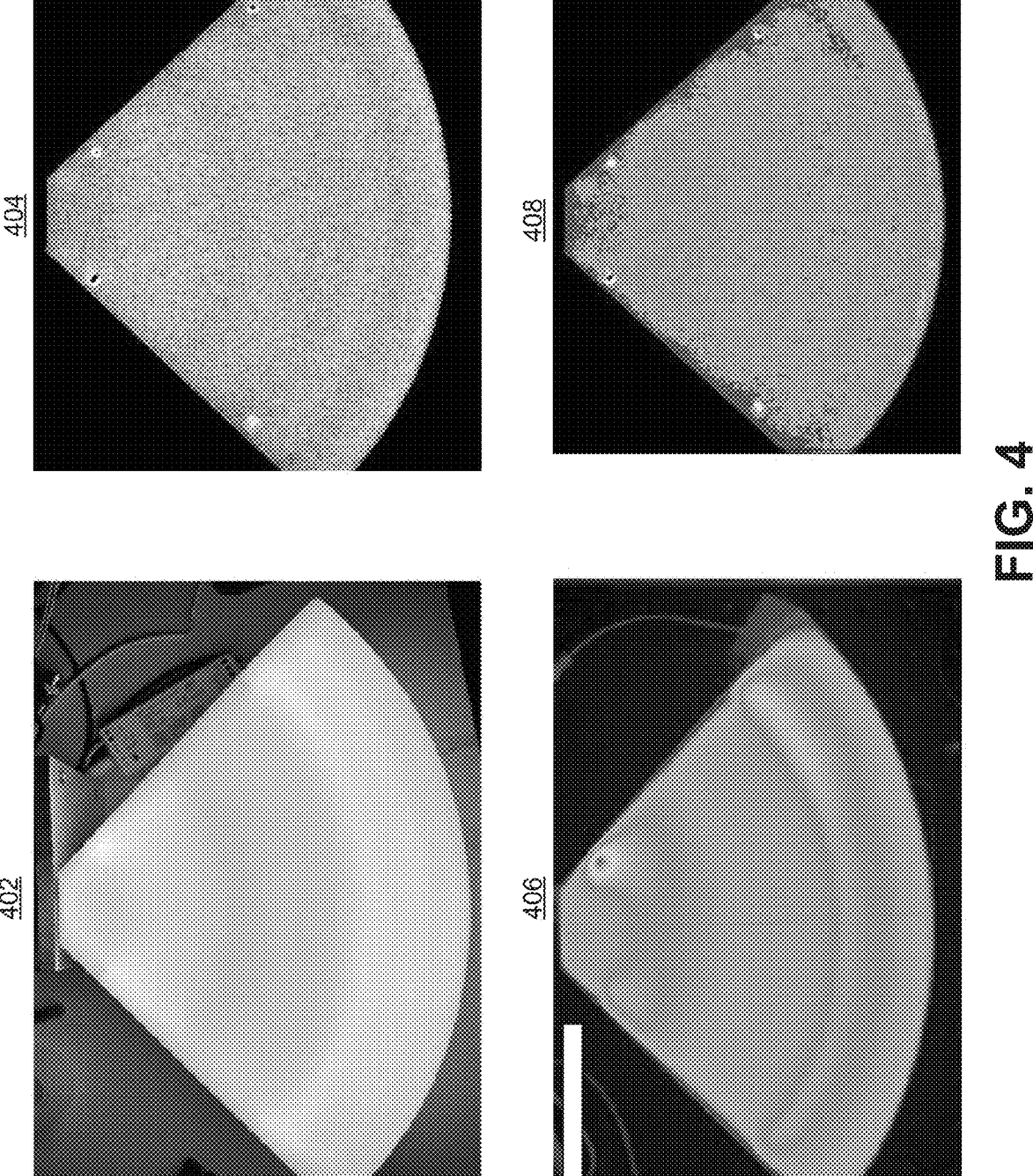
FIG. 4 illustrates a bottom surface view of a prototype and simulation of an example apparatus that may be used in accordance with various aspects of the present disclosure.

FIG. 4 illustrates another bottom surface view of a prototype and simulation of an example apparatus that may be used in accordance with various aspects of the present disclosure. FIG. 4 depicts optical design of an example system that may embody systems, techniques, and interfaces disclosed herein. The design depicted in FIG. 4 may be embodied, for example, by example system 100 depicted in FIG. 1. The design depicted in FIG. 4 includes a light guide with volumetric diffuser, such as the curved light guide 108 and volumetric diffuser 110 described previously in connection with FIG. 1. The example light guide and diffuser system depicted here uses 18 LEDs with 3.5 lm per LED.

View 402 and view 406 are photographs of a prototype light guide and diffuser system constructed in accordance with some previous descriptions of example system 100. View 304 and view 306 are images of a simulated light guide and diffuser system developed in accordance with some previous descriptions of example system 100. View 402 and view 404 illustrate the prototype and simulation in true color, while view 406 and view 408 are color-coded to depict the luminance at each point on the surface of the light guide and diffuser system. Colors closer to red on the color spectrum indicate greater luminance, and colors closer to violet on the color spectrum indicate lower luminance.

As shown in FIG. 4, both the prototype light guide and diffuser system and the simulated light guide and diffuser system show good uniformity of luminance across the bottom surface. The points of light seen in FIG. 3 are smoothed out by the diffuser system. The prototype light guide achieves an average luminance of 510 nit in the prototype model and 200 nit in the simulation.

Figure 5:
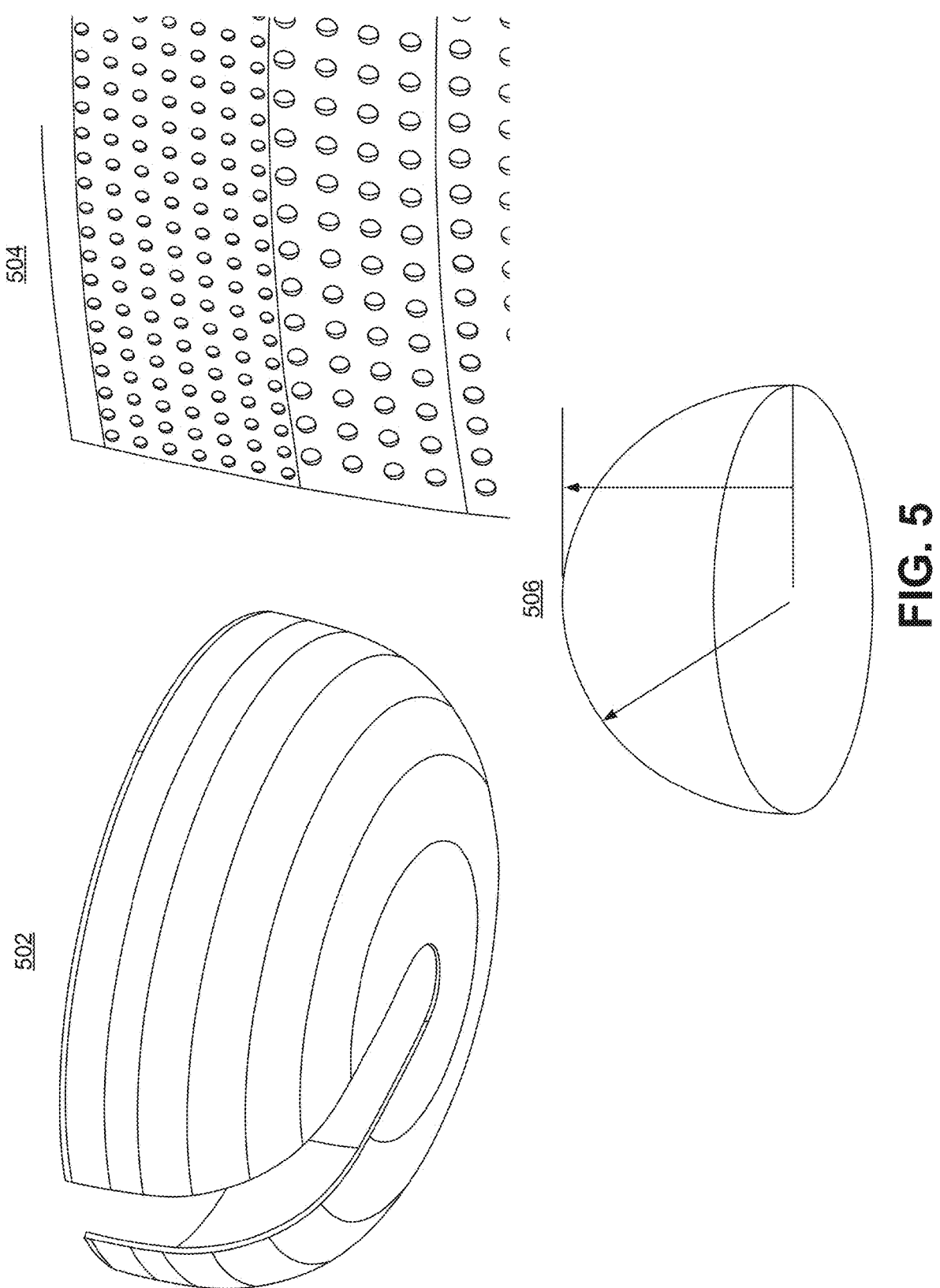
FIG. 5 is a design drawing illustrating an example curved light guide for providing thin structure illumination, in accordance with various aspects of the present disclosure.

FIG. 5 is a design drawing illustrating an example curved light guide for providing thin structure illumination, in accordance with various aspects of the present disclosure. FIG. 5 depicts an example system that may embody systems, techniques, and interfaces disclosed herein. The design depicted in FIG. 5 may be embodied, for example, by a curved light guide 108 of example system 100, described previously in connection with FIG. 1. View 502 shows the curved light guide (e.g., curved light guide 108), viewed at an angle from below. View 504 shows a zoomed-in view of the curved light guide (e.g., curved light guide 108), clearly showing the optical extraction features as rounded bumps on the surface of the curved light guide. View 506 is a depiction of a hemisphere-shaped optical extraction feature, indicating the radius and height of the optical extraction feature.

As seen in view 502, the pattern and shapes of optical extraction features vary across the surface of the curved light guide. Variation in the pattern and shapes of optical extraction features may depend on the local curvature of the curved light guide, as shown. Additionally, the surface of the curved light guide depicted in view 502 may be separated into regions, shown as the latitudinal bands about the surface of the curved light guide, where each region has defined properties for the positioning and shape of the optical extraction features. View 504 provides a zoomed-in view where the variation in spacing and shape of the optical extraction features between two regions can be more clearly seen.

The region depicted at the top of view 504 has smaller optical extraction features placed at a greater areal density, while the region in the center of view 504 has larger optical extraction features with less areal density. The size and shape of the optical extraction features may be varied by changing the radius and/or the height of the hemispherical shape, illustrated in view 506. The radius and height may be specified independently by considering the hemispherical shape as a sphere overlapping a plane, where the height is based on the relative position of the sphere and the plane, and the radius is the radius of the sphere.

By specifying the areal density, radius, and height of the optical extraction features, the amount of light allowed to escape the curved light guide may be tuned for different regions of the curved light guide surface. The varying amount of extracted light may account for varying optical properties of the different areas of varying local curvature in the curved light guide. By tuning the properties of the optical extraction features, more uniform luminance across the surface of the curved light guide may be achieved. In various examples, the area defined for each zone may also be varied to adjust optical extraction properties. In various examples, zones may not be used, and properties of the optical extraction features may instead vary approximately continuously across the surface of the curved light guide, or a hybrid approach may be used, with both zones and continuous changes being utilized.

Figure 6:
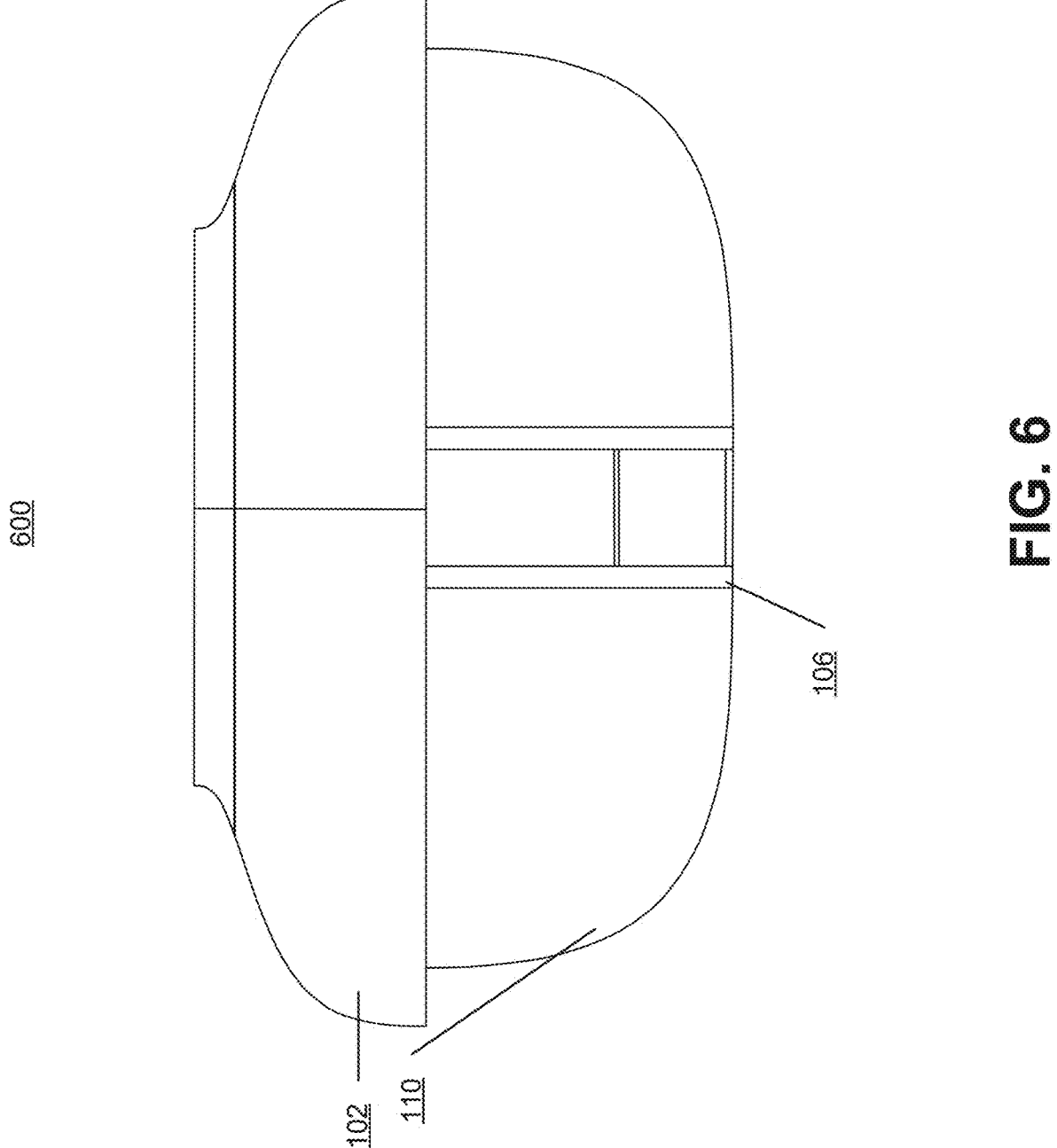
FIG. 6 is a design drawing illustrating an example apparatus comprising a curved light guide for thin structure illumination that may be used in accordance with various aspects of the present disclosure.

FIG. 6 is a design drawing illustrating an example apparatus comprising a curved light guide for thin structure illumination that may be used in accordance with various aspects of the present disclosure. FIG. 6 illustrates an alternate view of example system 100 in which the various components of example system 100 are connected and fully assembled. Depicted in FIG. 6 are top housing 102, volumetric diffuser 110, and part of reflector 106 may be viewed near the notch. Light sub-assembly 104 and curved light guide 108 are not visible in FIG. 6, as they are assembled beneath volumetric diffuser 110. In FIG. 6 the assembly of the notch with reflector 106 fitting tightly against volumetric diffuser 110 can be more clearly seen.

FIG. 7 is a flowchart illustrating an example process for manufacturing a curved light guide for thin structure illumination, in accordance with various aspects of the present disclosure. Example flowcharts are illustrated that contain example operations implemented by various examples described herein. The components described in connection with operations illustrated in FIG. 7 may be manufactured using a computer numerical control process. The computer numerical control process may direct various machining or turning processes to shape the parts described in connection with FIG. 7. The operations illustrated in FIG. 7 may be performed by an automated assembly process or by hand.

As shown by operation 702, the example method of manufacturing a device may include positioning a plurality of light-emitting diodes (LEDs) on a surface of a light sub-assembly. The LEDs may be positioned as described previously in connection with FIG. 1, in accordance with the design specifications of the light sub-assembly 104.

As shown by operation 704, the example method of manufacturing a device may include fabricating the curved light guide (e.g., curved light guide 108) using a turning process directed by computer numerical control. In various examples, the curved light guide 108 may be fabricated using a computer-controlled machining process to achieve requisite tolerances and consistency. In various examples, the curved light guide 108 may be fabricated using diamond turning to achieve high optical quality and eliminate the need for subsequent fabrication steps to finish the surface of the part. Diamond turning may be possible using optical-grade PMMC and/or PC material. Additionally, diamond turning may provide a desired SPI-A2 or other surface finish to the curved light guide 108.

Additionally, other plastic components of the example system 100 may be fabricated using computer numerical control and/or other machining techniques (e.g., top housing 102, reflector 106, volumetric diffuser 110). Furthermore, a vacuum casting fabrication process may be utilized to fabricate curved light guide 108 and/or other plastic components of the example system 100. Vacuum casting fabrication may provide lower cost and shorter development time for certain quantities of fabricated parts. In other examples, injection molding may be used for the manufacture of various plastic components of the example system 100.

As shown by operation 706, the example method of manufacturing a device may include positioning an edge of a curved light guide to be coupled to the light sub-assembly. The curved light guide (e.g., curved light guide 108) may be positioned as described previously in connection with FIG. 1. The curved light guide 108 may be coupled so that light emitted by LEDs of the light sub-assembly 104 may pass through the curved light guide 108.

As shown by operation 706, the example method of manufacturing a device may include positioning a curved reflector comprising an exterior surface to be coupled to an interior surface of the curved light guide (e.g., curved light guide 108). The exterior surface of the curved reflector (e.g., reflector 106) may be reflective due to reflective coating, paint, or the like. The reflector 106 may be positioned to couple to the curved light guide 108 as described previously in connection with FIG. 1. The reflector 106 may be positioned so that no gap exists between the reflector 106 and interior surface of the curved light guide 108. The reflector 106 may further be coupled to the top housing 102, as shown in FIG. 3.

As shown by operation 708, the example method of manufacturing a device may include positioning a volumetric diffuser (e.g., volumetric diffuser 110) to be coupled to the exterior surface of the curved light guide (e.g., curved light guide 108). The volumetric diffuser 110 may be positioned as described previously in connection with FIG. 1. The volumetric diffuser 110 may be positioned allowing an air gap between curved light guide 108 and volumetric diffuser 110 to allow propagation of light from the optical extraction features from the exterior surface of curved light guide 108.

As shown by operation 710, the example method of manufacturing a device may include positioning a projector lens assembly within a notch positioned along a latitudinal arc of the device. The projector lens assembly may be a component of a movable projector system 200, described previously in connection with FIG. 2. As described previously in connection with system 100, the components of example system 100 may include a notch allowing a movable projector lens to rotate and reposition for projecting an image onto various surfaces. In various examples, the manufacture of the device may include positioning the movable projector system 200 and/or any other electronic systems within the hollow interior of an example system 100.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. An electronic projector device comprising:
a movable projector sub-assembly comprising:
at least one processor,
at least one memory electronically coupled to the at least one processor,
a projector illumination source,
a projector lens positioned to project light from the projector illumination source onto a surface, and
a motorized positioning subsystem configured to adjust a direction of light projected by the movable projector sub-assembly;
a light sub-assembly comprising:
a curved light sub-assembly backing ring, and
a plurality of light-emitting diodes (LEDs), each LED of the plurality of LEDs being coupled to the curved light sub-assembly backing ring;
a curved light guide having an edge coupled to the light sub-assembly, the curved light guide comprising:
a pattern of optical extraction features that distribute light from the plurality of LEDs to an exterior surface of the curved light guide, the pattern of optical extraction features positioned on the exterior surface of the curved light guide with areal density based on a local curvature of the curved light guide for uniformly distributing light from the plurality of LEDs;
a curved reflector comprising an exterior surface coupled to an interior surface of the curved light guide, wherein the exterior surface is reflective, wherein an interior surface of the curved reflector surrounds the at least one processor and the at least one memory; and
a volumetric diffuser coupled to the exterior surface of the curved light guide,
wherein the light sub-assembly, the curved light guide, the curved reflector, and the volumetric diffuser each comprise a notch allowing the motorized positioning subsystem to reposition the projector lens about an axis parallel to a ceiling.

2. The electronic projector device of claim 1, wherein the curved light guide, the curved reflector, and the volumetric diffuser each have a hemispheric shape, wherein the areal density of the optical extraction features is based on a latitudinal position on the curved light guide.

3. The electronic projector device of claim 1, wherein the optical extraction features are hemispherical protrusions on the surface of the curved light guide, wherein a hemisphere radius and a hemisphere height of each optical extraction feature vary based on the local curvature of the curved light guide.

4. A device comprising:
a light sub-assembly comprising a plurality of light-emitting diodes (LEDs);
a curved light guide having an edge coupled to the light sub-assembly;
a curved reflector comprising an exterior surface coupled to an interior surface of the curved light guide, wherein the exterior surface is reflective; and a volumetric diffuser coupled to the exterior surface of the curved light guide,
wherein:
an interior of the device is hollow,
the interior is bounded by an interior surface of the curved reflector,
the light sub-assembly, the curved light guide, the curved reflector, and the volumetric diffuser each comprise a notch positioned along a latitudinal arc of the device, and
the notch forms a gap in the device allowing access to the interior of the device.

5. The device of claim 4, further comprising a curved light sub-assembly backing ring, wherein each LED of the plurality of LEDs is coupled to the curved light sub-assembly backing ring.

6. The device of claim 5, wherein the curved light sub-assembly backing ring comprises an aluminum core.

7. The device of claim 4, wherein the plurality of LEDs comprises a 2835 surface mount device (SMD) chip.

8. The device of claim 4, wherein the curved light guide comprises a pattern of optical extraction features positioned on an exterior surface of the curved light guide.

9. The device of claim 8, wherein the pattern of optical extraction features is positioned with areal density based on a local curvature of the curved light guide.

10. The device of claim 8, wherein an optical extraction feature from the pattern of optical extraction features is a hemispherical protrusion on the surface of the curved light guide.

11. The device of claim 10, wherein a radius of the hemispherical protrusion is based on a local curvature of the curved light guide, wherein a height of the hemispherical protrusion is based on the local curvature of the curved light guide.

12. The device of claim 4, wherein the curved reflector further comprises a raised lip around the edge of the notch positioned to reflect light away from the notch.

13. The device of claim 4, wherein the exterior surface of the curved reflector has at least 85% reflectance.

14. The device of claim 4, wherein the curved light guide comprises polymethyl methacrylate, wherein the curved light guide has at least 90% light transmission through three millimeters of material.

15. The device of claim 4, wherein the volumetric diffuser comprises plastic material, wherein the plastic material comprises 8% polyurethane material, wherein the volumetric diffuser has at least 20% light transmission.

16. The device of claim 4, wherein the curved light guide is fabricated using a turning process directed by computer numerical control.

17. The device of claim 4, comprising a movable projector sub-assembly, positioned inside the curved light guide, comprising:
a projector illumination source,
a projector lens positioned to project light from the projector illumination source onto a surface, and
a motorized positioning subsystem configured to adjust a direction of light projected by the movable projector sub-assembly.

18. The device of claim 17, wherein the projector lens is positioned within the notch.

* * * * *